US011605062B2

(12) United States Patent
Prakash et al.

(10) Patent No.: US 11,605,062 B2
(45) Date of Patent: Mar. 14, 2023

(54) PERSONAL PHOTOGRAPHER SERVICE, MAKING THEM AVAILABLE AS DIGITAL COLLECTIBLE, CURATING AND LOCAL RESTRICTED MARKETPLACE

(71) Applicant: Field Genie, Inc., Houston, TX (US)

(72) Inventors: Piyush Prakash, Houston, TX (US); Mano Samy, Sugar Land, TX (US)

(*) Notice: Subject to any disclaimer, the term of this patent is extended or adjusted under 35 U.S.C. 154(b) by 190 days.

(21) Appl. No.: 17/203,309

(22) Filed: Mar. 16, 2021

(65) Prior Publication Data

US 2021/0287195 A1 Sep. 16, 2021

Related U.S. Application Data

(60) Provisional application No. 62/989,897, filed on Mar. 16, 2020.

(51) Int. Cl.
*G06Q 20/12* (2012.01)
*G06Q 20/36* (2012.01)
(Continued)

(52) U.S. Cl.
CPC ....... *G06Q 20/1235* (2013.01); *B64C 39/024* (2013.01); *G06Q 10/02* (2013.01);
(Continued)

(58) Field of Classification Search
None
See application file for complete search history.

(56) References Cited

U.S. PATENT DOCUMENTS

| 7,305,182 B1 * | 12/2007 | Rhyne | G06Q 50/10 358/1.15 |
| 8,332,281 B2 * | 12/2012 | Smith | G06Q 30/0621 705/26.5 |

(Continued)

FOREIGN PATENT DOCUMENTS

GB 2601894 A * 6/2022 ............. G06F 21/10

OTHER PUBLICATIONS

Marisa Messina, Capturing memories: GeoSnapShot uses Amazon Rekognition to identify athletes, May 31, 2019, AWS Machine Learning Blog, all pages, Retrieved from the internet: https://aws.amazon.com/blogs/machine-learning/capturing-memories-geosnapshot-uses-amazon-rekognition-to-identify-athletes/ (Year: 2019).*

*Primary Examiner* — Paul S Schwarzenberg
(74) *Attorney, Agent, or Firm* — William H. Quirk; Alexander J. Antonio; Rosenthal Pauerstein Sandoloski Agather, LLP

(57) ABSTRACT

Systems and methods for performing automated drone-based photo-shoots of people in places of gathering/interests such as events, tourist spots, sports events, cultural shows, religious congregations, political rallies and conventions. Photos may be captured by drone-mounted cameras at the place of gathering/interest. The service can also be provided without a drone, and by using pre-installed cameras. These cameras can be controlled automatically using automated algorithms or manually by professional photographers to capture one or more images. Systems and methods for converting these media and other significant moments of the event into Digital Collectibles (Non-Fungible Tokens or "NFT") to enable ownership and provenance tracking, and resale in digital asset marketplaces are also described. Disclosed systems would automatically create a digital package including the captured media at the end of the photo shoot.

(Continued)

NFT Creation Process

Disclosed systems may provide an exclusive local marketplace for listing and selling these digital collectibles.

20 Claims, 8 Drawing Sheets

(51) Int. Cl.
  *G06Q 30/0601* (2023.01)
  *B64C 39/02* (2023.01)
  *G06Q 10/02* (2012.01)
  *H04W 4/021* (2018.01)
(52) U.S. Cl.
  CPC ....... *G06Q 20/363* (2013.01); *G06Q 20/3672* (2013.01); *G06Q 30/0641* (2013.01); *H04W 4/021* (2013.01); *B64C 2201/127* (2013.01)

(56) References Cited

U.S. PATENT DOCUMENTS

| | | | |
|---|---|---|---|
| 10,936,580 B2 * | 3/2021 | Shi | G06Q 30/018 |
| 11,075,891 B1 * | 7/2021 | Long | G06F 21/10 |
| 11,367,060 B1 * | 6/2022 | Barbashin | H04N 21/2541 |
| 2008/0274798 A1 * | 11/2008 | Walker | G07F 17/3237 |
| | | | 463/43 |
| 2019/0066000 A1 * | 2/2019 | Veloz | G06Q 20/322 |
| 2021/0304196 A1 * | 9/2021 | Patterson | G06Q 30/06 |
| 2021/0357489 A1 * | 11/2021 | Tali | A61B 5/349 |
| 2022/0069996 A1 * | 3/2022 | Xue | H04L 9/3239 |
| 2022/0114600 A1 * | 4/2022 | Blackburn | G06Q 30/0185 |
| 2022/0173893 A1 * | 6/2022 | Basu | H04L 9/3297 |
| 2022/0253811 A1 * | 8/2022 | Fowler | G06K 7/10366 |
| 2022/0292588 A1 * | 9/2022 | Collen | H04L 9/3236 |
| 2022/0351280 A1 * | 11/2022 | Cardenas Gasca | |
| | | | G06Q 20/0655 |
| 2022/0358418 A1 * | 11/2022 | Salik | G06Q 20/18 |

\* cited by examiner

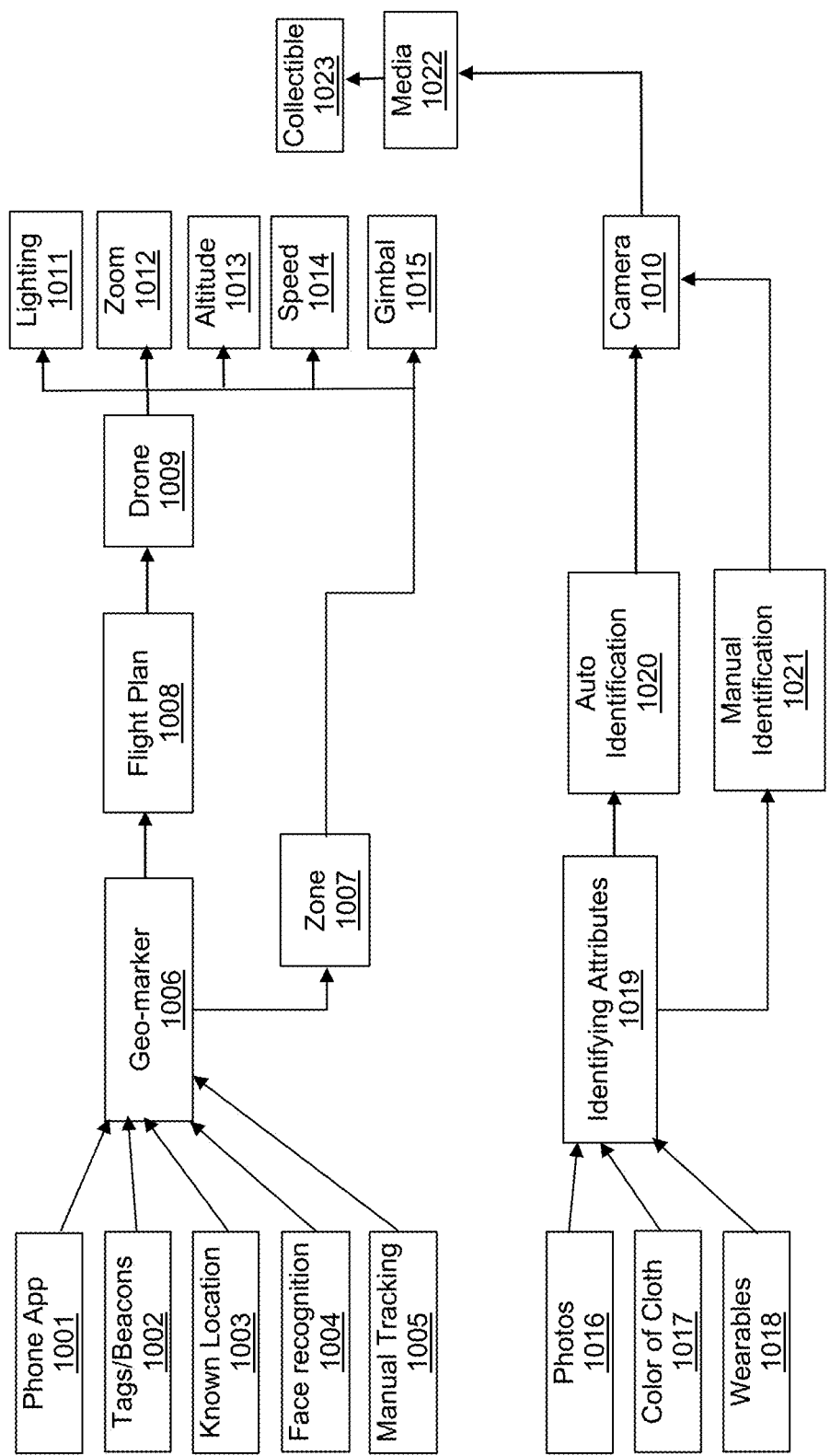
Fig. 1: Flow Diagram - Capture Location & Photos / Videos

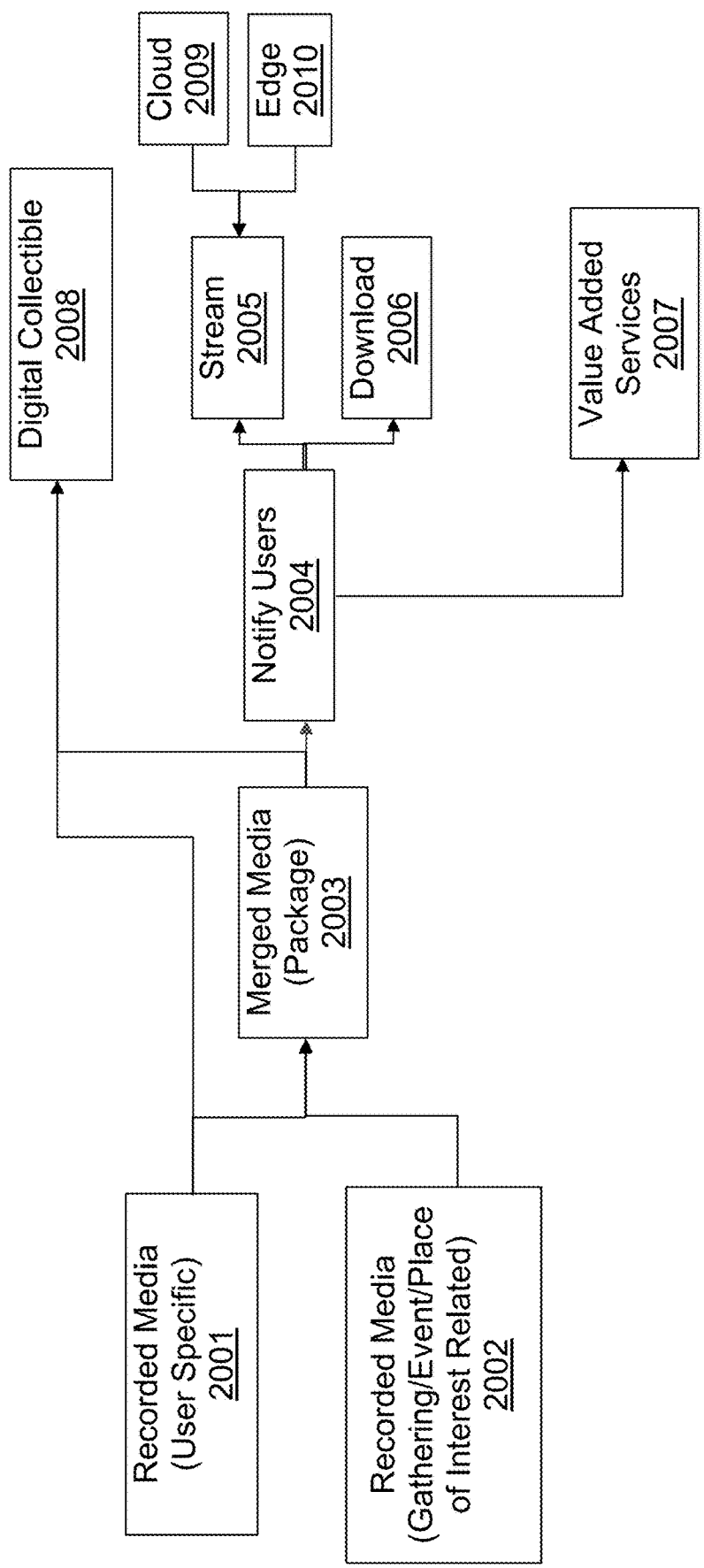
Fig. 2: Flow Diagram - Deliver Photos / Videos

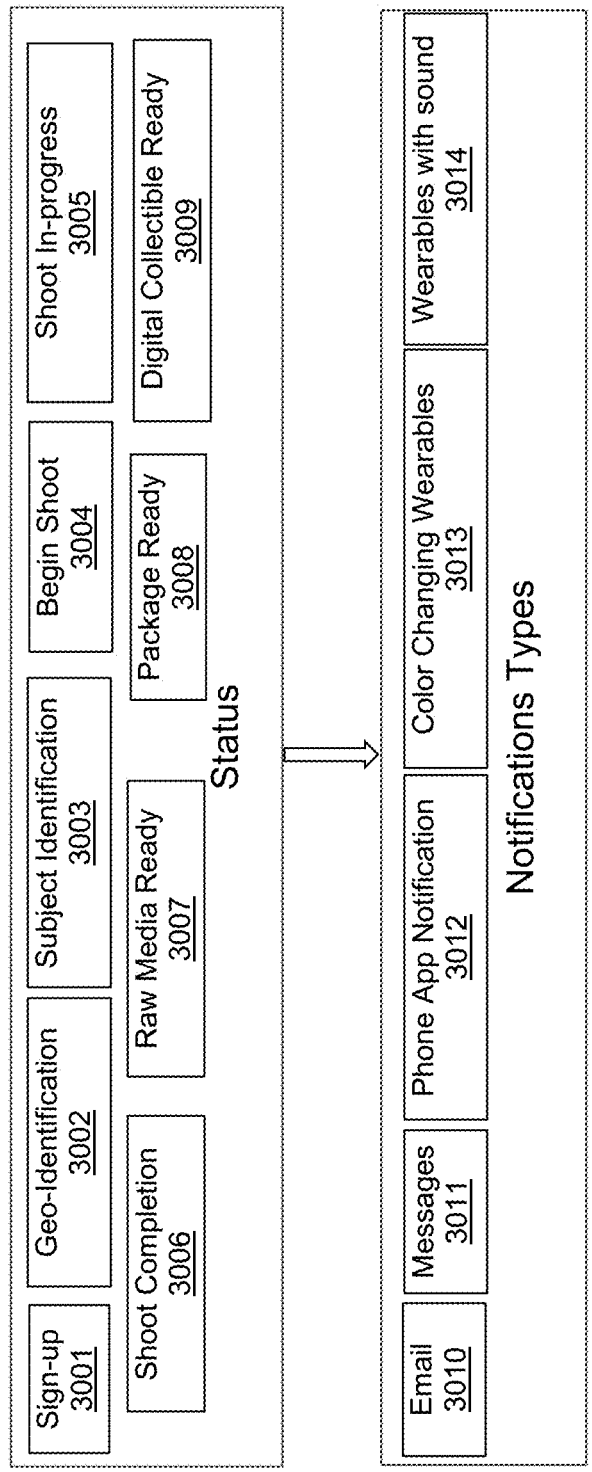
Fig. 3: Status and Notification

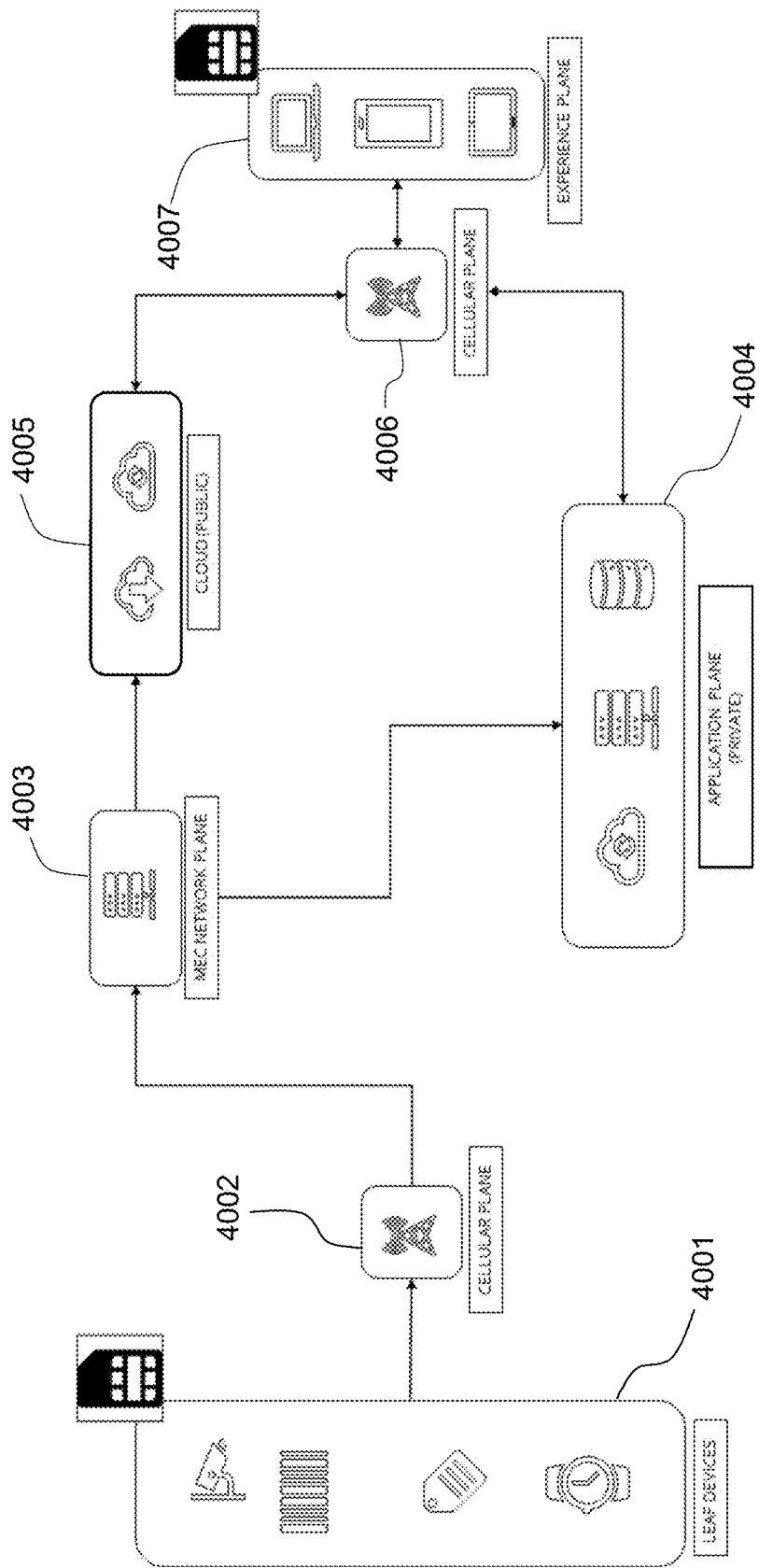
Fig. 4: MEC and 5G Usage for Personal Photography Service

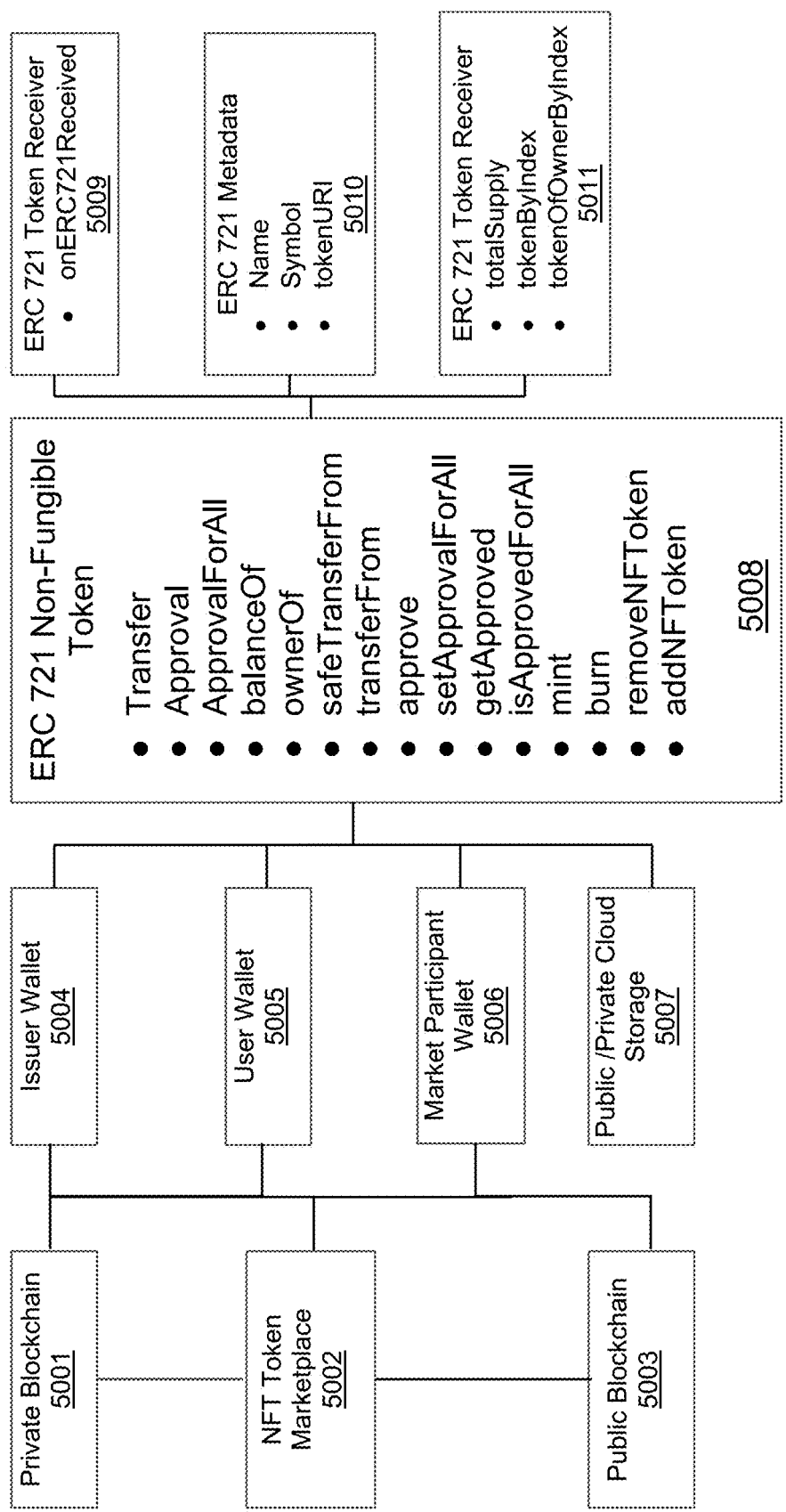
Fig. 5: Digital Collectible / NFT Management

Fig. 6: Mobile application user interface for Digital Collectibles

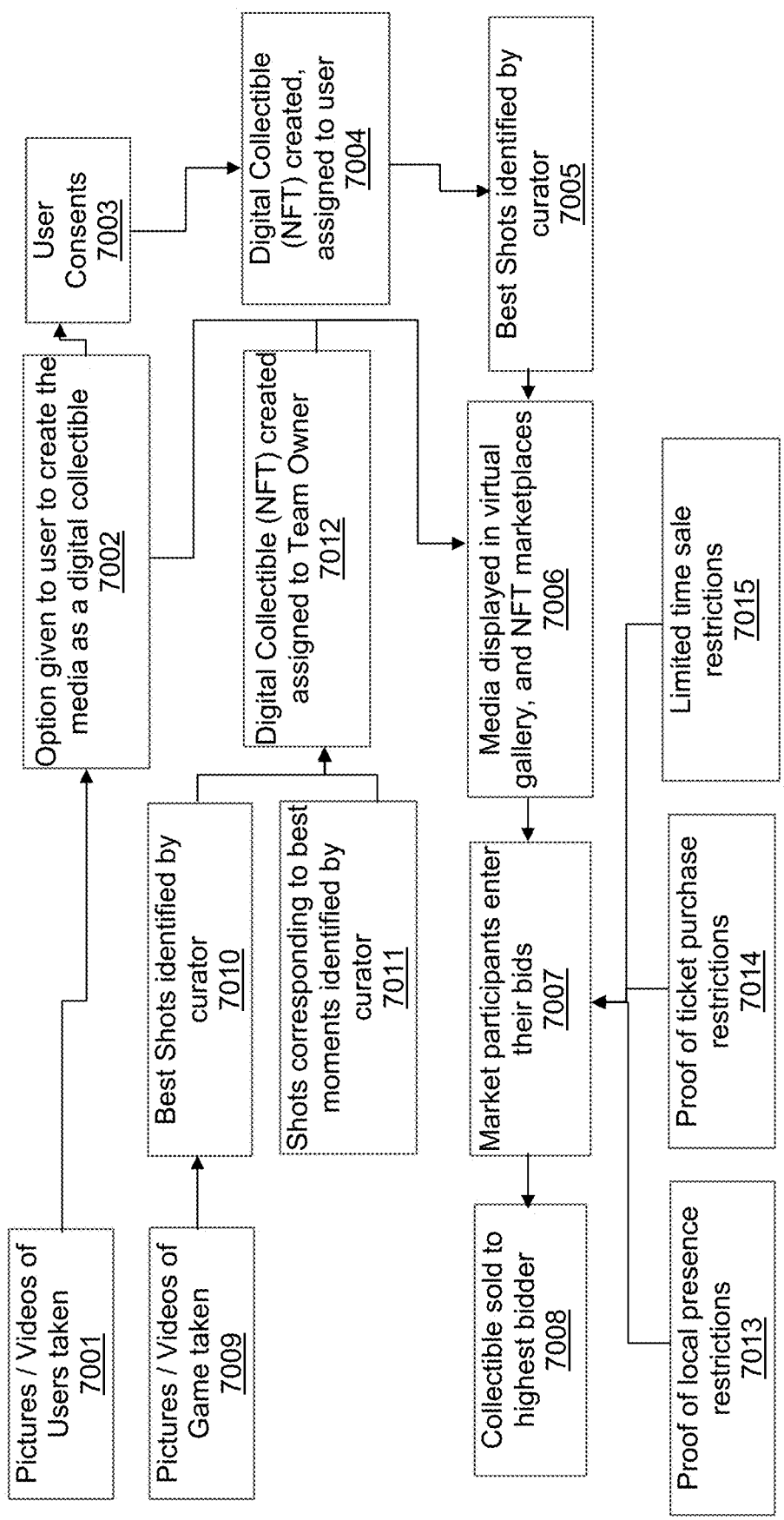
Fig. 7: NFT Creation Process

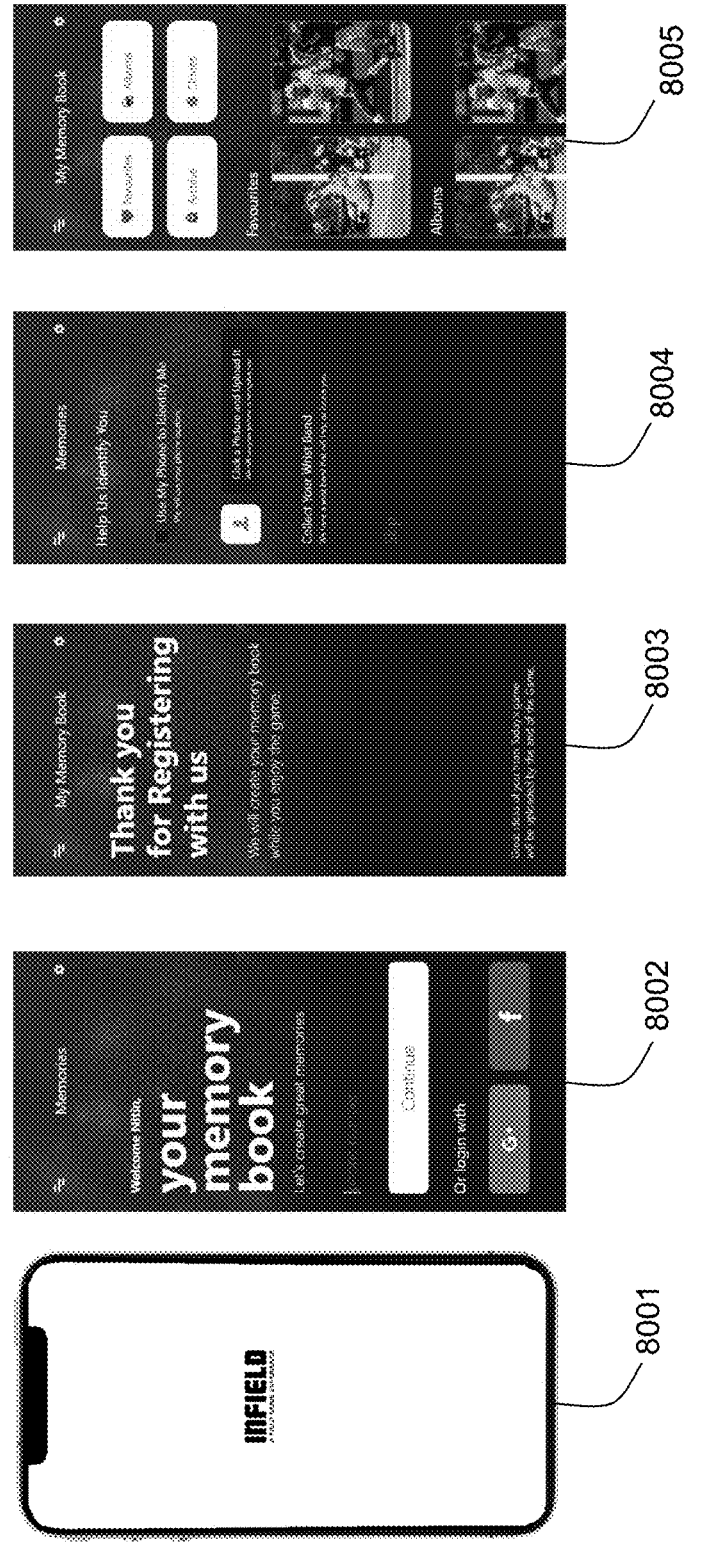
Fig. 8: Memories Mobile Application

PERSONAL PHOTOGRAPHER SERVICE, MAKING THEM AVAILABLE AS DIGITAL COLLECTIBLE, CURATING AND LOCAL RESTRICTED MARKETPLACE

CROSS REFERENCE TO RELATED APPLICATION

This application claims priority to U.S. Provisional Patent Application No. 62/989,897, filed Mar. 16, 2020, and titled, "PERSONAL PHOTOGRAPHER SERVICE". The entire disclosure of the above application is incorporated herein by reference.

FIELD

The present invention relates to systems and method for providing personal photo and video shooting services and making them available as a digital collectible and providing curation and marketplace services at places of gathering and places of interest using modern technologies in a fully or semi-automated manner.

BACKGROUND

Current experience at events and tourist spots is compromised by people trying to use their phones and personal cameras to capture photos and videos of the event.

People trying to create memories of the events and other places of interest often try to take a picture of themselves, i.e., a "selfie," which can lead to many issues.

Selfies being taken can jeopardize the safety of the person. There have been many incidents in the recent past where people have been injured or even died while taking selfies on a mountain, beach, or other risky places. Some people have died by mistakenly walking onto the road while taking a selfie and getting hit by the oncoming traffic.

Even when someone is not trying to take a selfie at an event but simply trying to capture the moment using their phones or cameras, they end up blocking the view of other attendees who may be standing or sitting behind them.

The reason that people go to these lengths to take the photos, videos, and selfies is to capture the memories of attending an event or visiting a place of interest.

Another reason is to capture the moment as evidence of them attending an event or being in proximity to an area of interest or celebrity.

Desire to share on social media is also a big motivation for many people to take these photos, videos and selfies.

Often the quality of self-taken photos, videos, and selfies is lacking. The quality of photos and videos taken by friends and family is often also not of good quality and defies the purpose why it was taken.

Finding a good vantage point and angle to take the photos and videos that would adequately capture the moment is also a big challenge, especially in crowded places (for example concerts, events, rallies, and the like).

It may not even be possible or safe to get to a good vantage point and angle to take the photos and videos in certain tourist spots such as mountains, hills, beaches, etc.

Often the taken photos and videos do not have the contextual information about the event, occasion, or the tourist spot. For example, a photo taken at a rock concert may not have the artist or stage in it.

When people or the venue get a rare picture or pictures of importance (including but not limited to photos taken at a historically significant moment/event), they would like the opportunity to control the distribution and monetize it by selling the digital rights to an interested party.

Many people and venues often do not have a clear and easy way to establish the digital rights and ownership for the captured images and/or the best moments of the event. Moreover, many people as well as the venue often do not have a way to auction, sell, or transfer the digital rights to the captured images to an interested party. Furthermore, venues often do not have a way to provide exclusive offers to patrons related to digital collectibles.

People often do not have an easy way for a professional curator to evaluate their digital collectibles and identify highly valuable items.

Many personal photographer services provided at tourist spots and other places of interest today are limited in nature and use static backgrounds. Many do not provide an experience which is contextual and customized to the end customer and venue.

Finally, the internet connection speed at large venues may deteriorate greatly if many or all of the patrons at the large venue are trying to use the internet connection at the same time.

Need exists for a technology and service that can provide an enhanced photography and video experience, as well as digital collectible and curation services at places of gathering/interests such as events, tourist spots, sports events, cultural shows, religious congregations, political rallies and conventions using geo-intelligent sensors, tags, cameras, drones, robots, phone apps, and in some cases, service professionals.

SUMMARY

Disclosed embodiments provide the ability to publish one's location using one or more technologies, including but not limited to technology tags, beacon, wristwatch, wearables, or a phone app.

Disclosed embodiments provide the ability to auto-detect one's location using cameras. Relatedly, disclosed embodiments provide the ability to auto-detect one's presence (latitude, longitude, altitude) at a particular location.

Disclosed embodiments provide the ability to receive the published geo-location and convert into a flight plan or instruction for a gimbal-mounted camera. Additionally or alternatively, the disclosed systems and methods provide the ability to receive the published geo-location, and convert into a pitch, yaw, roll, focus change plan for a pre-installed camera. Disclosed embodiments further provide the ability to feed the flight plan into a drone, create a flight plan for the drone, follow the flight plan, and reach the intended location. Once the location is reached, the drone can identify the person(s) who has requested pictures and/or videos be taken.

Once the drone identifies the person(s), the system may then direct a pre-installed gimbal-mounted camera or a camera with a built-in gimbal mechanism to turn towards the subject based on the calculated turn plan. In some embodiments, the camera is mounted on the drone.

In order to capture the desired images and to ensure the quality of the images, the disclosed systems and methods can auto-detect the lighting conditions near or around the subject and adjust the camera settings accordingly. In order to draw the attention of the subject who has requested photos and/or video, the system is configured to perform a particular action such as activating flashing LEDs in a wristband worn by the subject by use of a signal, make the tag/wristband vibrate, or by sending a push notification to the subject's phone.

By using a drone (or pre-installed cameras at the venue) to take the photos and videos, the images preferably can be captured from various angles and various vantage points. Optionally, a professional photographer may frame the shots remotely from a computing device using pre-installed cameras at the venue or a camera installed on the drone.

Furthermore, the drone or camera can be programmed to transport the media (video and/or photos) to a cloud server or a multi-edge computing infrastructure using methods including but not limited to wired network connections, wireless network connections, Bluetooth connection, and 4G or 5G cellular networks.

Another aspect of the disclosed embodiments provides for software to produce a video by merging the user specific media to the contextual media related to the gathering or place of interest. Moreover, the software may provide the option to publish the recorded or merged media as a digital collectible with proof of identity, including but not limited to ownership provenance information.

Once the captured images are compiled, the system can notify the user that the video and/or photos are ready to be streamed or downloaded.

The system can further allow the user to accept the digital rights to the newly created digital collectible with the ability for the user to resell the digital rights to the collectible in a collectible marketplace.

As an option, the system can make the collectibles available to a curator for rating and pricing. The curator can select the best captured moments of the event and create them as digital collectibles.

The system can further provide a local marketplace to list and sell the digital collectibles. Optionally, the system may restrict the sale of the digital collectibles to only the participants physically present at the venue through geo-fencing. Optionally, the system may restrict the sale to only the participants who had purchased a ticket to the event. Optionally, the system may restrict the duration of any sale to last only during the event.

The disclosed systems and methods can offer related services such as event-themed photo frames, autographed photos by one or more celebrities at the event, personal messages from the celebrity, and the like.

Disclosed embodiments have the ability to route all video feed from the cameras to an edge-connected gateway instead of a cloud service for sub-second lag and real-time control of the camera using technologies including but not limited to multi-edge-computing and 5G and/or 6G (when/where available).

Disclosed embodiments further have the ability to route all internet traffic to access the created media to a local service using multi-edge computing to support a large number of users accessing the service at the same time without any noticeable lag.

Presently preferred embodiments are configured and adapted to automate all of the above processes in a way that the service can be scaled to provide similar services to all of the people in a large venue.

In keeping with the processes and features described above, disclosed embodiments provide a system for providing personal photo-shoot service for any person at a gathering or a place of interest using the fine location of the person, presence, or other visual indicators, including but not limited to: automating the whole photoshoot by use of one or more technologies such as fine location tracking of the subject, automatic flight plan generation, automatic drone take off and landing, automatic camera adjustments, photo shoots, and post processing of media; alerting the subject that photoshoot is about to start; auto-verification/identification of the subject before the start of the photo-shoot using machine learning, tags, beacons, or other visual indicators; using fixed cameras as an alternative to a drone-mounted camera to achieve the same results for some venues and places of interest; optionally, using professional photographers to compose the shots of a drone photo-shoot or by using mounted cameras at the venue or location; and automatic package creation with the photos and/or videos of the subject embedded in photos and/or videos of the event, gathering, or place of interest.

The present disclosure includes embodiments that enable users to monetize the recorded photos, videos or packaged media by creation of Digital Collectibles or Non-Fungible Tokens (NFTs) from the captured media, including but not limited to: adding the Digital Collectibles to user's digital wallet; providing for users to list these collectibles for resale exclusively in the local digital asset marketplace during the event and the broader marketplace at a later stage; professional curators to rate the collectibles and list them; and providing value-added products such as printed photos autographed by an artist or celebrity, personal messages from an artist or celebrity, and the like, to the customer.

Disclosed embodiments further provide a system to enable venue owners to monetize the event by creation of Digital Collectibles or Non-Fungible Tokens (NFTs) from the captured media and/or significant moments of the event; adding the digital collectibles to the venue owner's digital wallet; providing for the venue owner to list these digital collectibles for resale exclusively in the local digital asset marketplace and the broader marketplace at a later stage; and for a professional curator to rate the digital collectibles and list them for sale.

Disclosed embodiments further allow local and time-limited sales of these digital collectibles exclusively at the venue during the event. Disclosed embodiments can provide a virtual hall or gallery for listing all the digital collectibles related to the event. Furthermore, disclosed embodiments can enforce restrictions on the sale including but not limited to a requirement of physical presence of all bidders at the venue at the time of bidding, proof of ticket purchase to allow bidding, etc. Disclosed embodiments may also restrict sales of the digital collectibles to time-limited sales available only for the duration of the event and/or to limit the quantity of sales. Disclosed embodiments may also enable curators to rate and/or rank the digital collectibles and provide featured listings.

Disclosed embodiments further provide for a method to use the MEC (Multi-Access Edge Computing) and 5G networks to be able to achieve the objectives as described, including but not limited to: set up necessary virtualization infrastructure at the venue, which supplies computing, storage, and network resources to the mobile edge applications; establish network plane functionality, included in the virtualization infrastructure, which applies rules and enforces access control lists; route cellular traffic between network plane and mobile and other cellular-enabled applications; establish the mobile edge platform, within the host, providing service and application assistance for MEC-enabled mobile applications; authentication and authorization of mobile edge functionalities, including listing, publishing, and notification of any state changes; support launch, quiesce, and graceful termination of mobile edge applications based on configurable rules and criteria; and store data related to each mobile edge application within the platform.

BRIEF DESCRIPTION OF THE DRAWINGS

FIG. 1 depicts the flow for the identification of the fine (high resolution) location of the subject, including other identifying attributes.

FIG. 2 depicts the flow for the merging of the user specific photos and videos with the contextual photos and/or videos of the gathering or location and creating a digital collectible (Non-Fungible Token or "NFT").

FIG. 3 (Status and Notification Types) shows examples of various statuses when a notification could be sent to the users.

FIG. 4 depicts the routing of data and media from various devices that are sent to the cellular network to be re-routed through multi-edge computing plane and processed locally in the application plane set up at the premises to provide low latency and sub-second response times.

FIG. 5 depicts the storage of media as a digital collectible or NFT and the management of the digital collectibles.

FIG. 6 depicts various screen captures related to digital collectibles from an application on a user's mobile device.

FIG. 7 (NFT Creation Process) explains the flow of how digital collectibles will be created for the event.

FIG. 8 depicts various screen captures from an application on a user's mobile device.

DETAILED DESCRIPTION

The present disclosure provides systems and methods for location-aware photo-shoots of people at places of gathering/interests such as events, tourist spots, sports events, cultural shows, religious congregations, and political rallies and conventions, by automatically finding the fine/high resolution location of the person at the right moment, self-navigation of a drone to that location via automatically generated flight plans, conducting a photo-shoot using drone-mounted cameras (or pre-installed cameras at the location or venue), automatic and manual editing of the content to produce a professional package and delivery to the user, and converting these media as digital collectible assets (Non-Fungible Tokens or "NFTs") that are tradable in a marketplace.

As an alternative to some of the automated process described, personal photographer service experience can also be provided without the use of a drone and using pre-installed cameras at venues including but not limited to stadiums, concerts, shows, and the like.

The following are the different steps in the invention. In accordance with the present disclosure, the systems and methods described (enhanced Personal photographer and digital collectible service) can be provided with or without some or most of the steps listed below.

Venue Preparation:

FIG. 1 depicts a flow diagram for location identification and the capture of photo and/or video images at the location at the request of a user. The venue where this service needs to be provided may require preliminary setup before the start of the event occurs.

Gateways and/or anchors may be set-up throughout the venue to be able to receive location information from the sensor tags issued to persons. Gateways and/or anchors may be calibrated with the geometry of the venue to be able to achieve a higher accuracy in location determination. Interferences in the venue due to, for example, walls or metallic structures have to be compensated for when setting up the gateways and/or anchors. Gateways may auto-calibrate themselves based on known general characteristics and rough geometry parameters.

Geo-location could be fed into a flight plan for a drone to follow and reach the subject's location. Alternatively, the location can also be fed directly to a pre-installed camera and associated gimbals, which can be programmed or manually controlled in the right direction.

Allowable drone flight paths may need to be defined and registered in accordance with local regulations. When the drone (1009) is not pre-programmed but its flight is controlled by a drone operator, the system may need to ensure that all flight paths are in the line of sight of the drone operator.

The venue may also be fitted with fixed-mount cameras (1010) at one or more locations around the venue that can perform photo capturing for the zones around them.

The venue may be setup with a multi-edge computing network to perform all computations locally instead of in the cloud.

The venue may be setup with high-speed low latency communication technologies like 5G or 6G (when and where available) that can automatically route all users' traffic to the local server instead of a cloud service.

Registration and Location/User Identification:

An interested person ("subject" or "user") would typically register for the service before or when the person arrives at the event venue. Someone else (for example a tour operator) may also be able to register on behalf of a person at the location or venue. The registration can also come as part of a bundled package. The service can also be provided for unregistered users, who can pay for the service at a later point in time (or someone else pays on their behalf).

The photo shoot can be programmatically controlled using a trained Machine Learning Model or manually controlled remotely by a photographer.

The user's fine location must be identified before a photo shoot can take place. Steps 1001 to 1005 show examples of ways in which the subject's location can be determined, including manual determination (Step 1005). As shown, the user's location may be identified via an application ("app" or "phone app") on the user's mobile device. Global positioning system (GPS) location data may be provided by the phone app (1001) to aid in locating the user. Other location aids may include tags or beacons (1002), the location may already be known (1003), or even facial recognition (1004) may be employed.

Once the subject's location has been determined (step 1006), the geo-marker can be fed into a flight plan (step 1008) or can be fed directly to a camera/Gimbal (step 1007 and 1015) in those circumstances in which one or more cameras (1010) are strategically located throughout the venue.

Identifying Attributes (1019) are used to identify the subject before a shot (photo/video) is taken by camera(s) mounted on a drone or installed on a static platform with a gimbal. Steps 1016 (Photos), 1017 (color of clothes) and 1018 (wearables) are examples of ways in which a subject can be identified (step 1019). The identification of the subject can be automatic (step 1020) using software and algorithms, or the identification can be performed manually (step 1021).

A unique digital wallet may be created for the users to store their digital collectible artifacts. Optionally, users can link their own pre-created digital wallets to receive their collectibles.

A user can optionally provide their preferences about the photo-shoot, such as which shots they like, how many pictures they like, if anyone else must be in the pictures, what is their preferred time to be pictured, and the like.

Users would also provide identifying information such as the color of one or more items of clothing they are wearing, if they will be wearing a hat, jacket, and the like.

A user can optionally provide their preferences about making their photographs as digital collectibles (Non-Fungible Tokens) and curate them in order to establish a price rating, and an option to list them in a marketplace for the digital rights to the NFTs to be sold to the highest bidder.

The user may be provided with a tracking device that serves as a tag or beacon 1002, such as a wearable sensor tag, or a hand-held tag. Optionally, the user may download the application on the user's mobile device, if the mobile device already supports fine resolution tracking of the user's location. The tracking device may also have indicators such as LED lights, tactile feedback mechanisms such as vibration, and the like, that signal to the user that the user has been located and the image capture session is soon to begin. The user may wear or carry the tracking device throughout the event. They person may be requested to return the tracking device at the end of the event (or drop the tracking device in collection boxes) for a reward (e.g., reduced price).

Prior to the beginning of the photo shoot, the fine (high resolution) geo-marker 1006 as well as identification attributes are used by camera(s), gimbal(s) and drone(s) to decide the shoot parameters, including but not limited to Lighting (step 1011), zoom (step 1012), altitude (step 1013), and speed (step 1014).

Photo-Shoots:

Photoshoots may be initiated either upon the request of the user or automatically initiated by the system. The system would receive the fine location of the subject. The system may convert the location information into a flight plan and correspondingly program that flight plan into a drone. Alternatively, the system may provide the location information to a drone operator or feed the location information to one or more pre-installed cameras at the venue.

The drone (1009), with one or more cameras mounted thereon, may automatically take-off and fly to the location utilizing the entered flight plan data (1008). If the drone (1009) was already in flight and was finishing up a prior photo-shoot, the drone may move directly from its present location to the next location of the current user.

Alternatively, the system may convert the location information into pitch/yaw/turn instructions for a pre-mounted camera and feed the instructions to a pre-mounted camera located in the same zone at the location or venue as the user.

When the drone (1009) arrives at the location, the system may activate the wristband/handheld sensor (1002) of the subject to indicate to the subject that the photo shoot is about to begin. Alternatively, when the pre-mounted camera (1010) turns towards the user, the system may activate the wristband/handheld sensor (1002) of the subject to indicate to the subject that the photo shoot is about to begin. Alternatively, the system may also send a push notification to the subject's mobile device, preferably through the phone app (1001), or alternatively by other methods such as SMS messaging.

The subject may acknowledge the action by pushing a button on the sensor (1002)/phone app (1001), or simply by waving a hand at the drone in flight.

A human operator may also be employed to review the live footage to ensure drone positioning is correct and select an approval button for the photo shoot or be able to make some fine adjustments and then approve.

Upon approval, the camera (1010) (mounted on a drone or pre-installed) may activate and may assess the lighting in the area. The camera (1010) may also be activated without a pre-approval from the subject.

The drone or mounted camera (1010) may take a series of pictures or videos. The drone or mounted camera (1010) may auto adjust the lens settings based on the lighting conditions.

The drone (1009) may fly in some predefined patterns to get panoramic views and other visual effects. The drone (1009) may alter its speed (1014), altitude (1013), and/or settings of the gimbal (1015) to get different image captures of the subject. In addition to capturing one or more images of the subject, the drone (1009) may maneuver in flight to capture one or more images of the event and/or stage, including the subject in the image.

The camera feed may be transmitted live to an edge gateway where artificial intelligence models will run to identify the best shot. The edge gateway may stream instructions back to the camera for necessary adjustments and start the recording and/or to take the photo remotely.

A professional photographer may also take control of the drone (1009) and compose the shots.

At the end of the photoshoot, the system may send another notification/tactile/LED or other feedback mechanism to indicate to the subject that the photoshoot is complete. At the completion of the photo shoot, the footage (step 1022) from the camera(s) is then stored on a storage device. The storage device can be on the edge (drone/camera/gimbal/edge gateway) or on a server. The media (1022) can be converted into a Digital Collectible (NFT) with ownership and provenance information (step 1023).

Post Processing:

FIG. 2 depicts a flow diagram illustrating the delivery of the media to the user. Once the photo-shoot is over, the recorded media from the storage device (at the edge or on a server) (step 2001) is merged with the pre-recorded media (contextual to the gathering, event, show, place of interest, etc.) (step 2002) to create a final package (step 2003). The drone camera (or the fixed mount camera) may stream the user-specific contents to the server or the edge computing infrastructure. Users are notified once merged media (package) is available for them to access via streaming (step 2005) or to download (step 2006). Optionally, the streaming system would reroute the traffic to a local edge gateway (step 2010) instead of a cloud service (step 2009).

The computing infrastructure may process the pictures and/or videos, including making any adjustments to the quality of the pictures and/or videos. For example, additional value-added services (for example, photo frames, custom editing, social media publishing, key chains, etc.) could also be offered to the users (step 2007).

The computing infrastructure may combine or merge the captured images with other video or images of the event to create the package for delivery. Optionally, the post processing and touch-ups may be performed by a professional image artist. The completed package may be uploaded to a server or copied to a storage device. Optionally, the package may be converted into a digital collectible 2008 with ownership and provenance information and sent to the user's digital wallet.

The subject or a representative of the subject may be notified at this point that their photo-shoot pictures and/or videos are available for download (or stream). Additional options may be provided for the subject to buy related products such as souvenir photo frames and the like. Additional options may be provided to have these photographs printed and autographed by a celebrity at the event.

Subsequent to creation of NFTs, additional options may be provided to have these media listed in a digital asset marketplace for resale or auction. Optionally, a professional curator may select the best shots of the day and place those digital collectibles in a marketplace for sale after getting approval from the user. Other contextual media may be added to the package. For example, a personal message from the celebrity/artist, background information about a venue or tourist spot, best moments of the game, and the like.

The subject or an authorized representative of the subject may also be able to collect the package on a storage device right after the photoshoot at the venue, place of interest, or another designated location.

Marketplace:

The digital collectibles may be posted on a Virtual Hall or Gallery for anyone with access to view. The collectibles may be entered exclusively into a local marketplace for auction or sale during the event. Optionally, restrictions could be applied including but not limited to proof of presence (only patrons present physically can bid), proof of ticket purchase (only patrons who have ticket to the event can bid), time-limited sale (collectibles sold on the local marketplace only during the duration of the event), and quantity limited sale (only limited quantities will be available for sale in the local marketplace)

After the end of the event, the collectibles can be listed on the broader public marketplaces and the sale could be opened up for any interested party to purchase.

It is anticipated that the digital collectibles will be first created on a private blockchain, with an option to migrate to a public blockchain if requested by the buyer.

FIG. 3 depicts various status indicators and notification types. The system will confirm that the user has registered or signed up for the service (3001).

As previously described, the system will determine the location of the user (3002), identify the user at the location (3003), begin the photo shoot (3004), continue with the photo shoot as initially requested by the user (3005), and verification is made once the photo shoot has been completed (3006).

After completion of the photo shoot, the system compiles and verifies the captured images (3007) prior to processing the images. Processing includes compiling the images into a package (3008) as requested by the user. The system may then convert some or all of the captured images into digital collectibles (3009).

As previously described, a variety of notification types may be utilized by the system, including email (3010), messages including Short Message Service (SMS) messages (3011), notification via a phone app (3012), color-changing wearables worn by the user (3013), and wearables with sound and/or vibration (3013).

FIG. 4 depicts a flow for routing the captured image data or media. Data and media are routed from various depicted devices (step 4001), and the data and media are sent to a cellular network (step 4002) to be re-routed through a multi-edge computing plane (step 4003) and processed locally in the application plane (step 4004) set up at the premises to provide low latency and sub-second response times. The media could also be sent to the cloud (step 4005) for access from devices that are not supported by the 5G infrastructure (step 4002 and step 4003). Similarly, media requests from the audience or others at the venue (step 4007) made to the cellular network (step 4006) could be routed either to the local application plane (step 4004) if the particular mobile devices are compatible or to the cloud (step 4005) if the mobile device does not support 5G connection and/or MEC computing.

FIG. 5 depicts the storage of media and the creation and management of digital collectibles or NFTs. The storage of media preferably occurs in a public or private cloud (step S007), and the media is tokenized and stored in a private blockchain (5001) or public blockchain (5003), including but not limited to ethereum mainnet.

In preferred embodiments, the digital collectible will be created as a non-fungible token ("NFT") using an ERC-721 contract (step S008), and the contract will also support Token Metadata (step S010) and enumerability (step S011). The tokens for collectibles that are owned by the venue will be registered to the issuer's wallet (step S004), and the tokens for collectibles that are owned by users will be registered to the user wallet (step S005). Both the issuer wallet (step S004) and user wallet (step S005) will support token receiver specification (step S009) to support safe transfers. The tokens can be subsequently listed in a NFT token marketplace (step S002) and made available for purchase by market participants (step S006) in an open auction.

FIG. 6 depicts various screen captures from a phone app. These screen captures include a splash screen (step 6001), and a sign-up and login screen (step 6002) for the user to get registered in the system, at which stage a digital wallet will be created for the user by the system.

Users will receive a notification (step 6003) when either their own photos and/or videos are converted into a digital collectible, or if the venue-created media is created as a digital collectible and made available for sale in limited quantities. Users will be able to sign in into the application and will be allowed to participate in the digital collectible auction (6005). Optionally, the sale could be restricted to only users who are present at the venue, and system would verify as much based on the user's current location (step 6004) as detected and identified by the system.

FIG. 7 depicts the creation of NFTs created using captured data from the event or place of interest. Photos and/or videos of a user will be captured (step 7001) as previously described. The user will be given an option (step 7002) to convert their personal captured media into a digital collectible and to list the media in a virtual gallery for display to everyone, and potentially for sale (step 7006). If the user consents (step 7003), a digital collectible will be created (step 7004), and the best photos and/or videos among the captured media will be identified by the curator (7005) and showcased (7006).

The digital collectibles will be available for bidding (step 7007) and will be sold to the highest bidder (7008). Optionally, geographic restrictions can be placed on bidders to encourage sale to only the participants who are physically present at the venue (step 7013). Proof of ticket purchase restriction (7014) and a limited-time sale restriction (7015) can also be applied.

Photos and/or videos of the event itself (step 7009) can be curated (7010), or media corresponding to the best moments of the event (e.g., records broken) (step 7011) can be identified by the curator. The curator-identified media or event, or any other virtual artifact can be created as a digital collectible (step 7012) and can be listed in the virtual gallery (step 7006) for auction and sale as well.

FIG. 8 depicts various screen captures from the phone app. These screen captures include a splash screen (step 8001), sign-up page (step 8002) and a registration confirmation page (step 8003).

After registration, and prior to the requested photo shoot, the system prompts the user to provide one or more identifiers that can help the system identify the user at the venue or place of interest for the photo shoot. The identification could include one or more of (a) a user's phone location; (b) a user's self-uploaded pictures showing the color of one or more items of clothing and accessories the user is wearing; and (c) a wristband that can provide the current location of the user (step 8004). The system will capture and process the photos and/or videos taken of the user, as well as other digital collectibles purchased and make these available for viewing on the user's memory book (step 8005).

We claim:

1. A method for creating and selectively offering for sale non-fungible tokens in a non-fungible token marketplace, the method comprising:
   verifying an issuer's presence at a defined venue;
   capturing with a digital camera, by the issuer, a digital image at the defined venue;
   loading the digital image to a server;
   tokenizing and storing the digital image to a blockchain hosted by the server;
   creating, from the tokenized digital image stored to the blockchain, a non-fungible token (NFT) associated with the digital image using a NFT contract;
   registering the NFT associated with the digital image to an issuer NFT wallet associated with the issuer and hosted on an NFT marketplace compatible with the NFT contract;
   offering the NFT associated with the digital image for sale in a selective virtual gallery of the NFT marketplace to a selective group of participants for a defined time period, wherein the offering is restricted such that each participant of the selective group of participants must meet a defined participant criteria;
   in response to one of the participants of the selective group of participants purchasing the NFT associated with the digital image within the defined time period, registering the NFT associated with the digital image in a NFT wallet of the participant hosted on the NFT marketplace; and
   in response to none of the participants of the selective group of participants purchasing the NFT associated with the digital image within the defined time period, offering the NFT associated with the digital image for sale in an extensive virtual gallery of the NFT marketplace to an extensive group of participants, wherein the extensive group of participants includes participants that do not meet the defined participant criteria.

2. The method of claim 1, wherein the defined participant criteria is that the participant be present at the venue.

3. The method of claim 2, wherein the participant's presence at venue is identified by the NFT marketplace by a NFT marketplace device application associated with the NFT marketplace and installed on an electronic device of the participant, wherein the NFT device application is configured to acquire the participant's location from the electronic device of the participant.

4. The method of claim 1, wherein:
   an event is being held at the venue;
   the defined time period is the time frame during which the event takes place;
   the capturing of the digital image is performed at the event during the defined time period; and
   the defined participant criteria is that the participant be present at the event during the defined time period, wherein the participant's presence at event is identified by the NFT marketplace by a NFT marketplace device application associated with the NFT marketplace and installed on an electronic device of the participant, wherein the NFT device application is configured to acquire the participant's location from the electronic device of the participant.

5. The method of claim 1, wherein the issuer's presence at the defined venue is verified using by the NFT marketplace by a NFT marketplace device application associated with the NFT marketplace and installed on an electronic device of the issuer, wherein the NFT device application is configured to acquire the issuer's location from the electronic device of the issuer.

6. The method of claim 1, wherein:
   the offering of the NFT associated with digital image for sale in the selective virtual gallery of the NFT marketplace comprises offering the NFT associated with digital image for sale to a highest bidder; and
   the method further comprises:
      receiving a bid from a plurality of participants of the selective group of participants,
      determining the highest bidder of the plurality of participants based on the received bids, and
      registering the NFT associated with digital image to a NFT wallet of the highest bidder hosted on the NFT marketplace.

7. The method of claim 1, wherein the defined participant criteria is that the participant be shown in the digital image.

8. The method of claim 1, wherein the server is part of an edge computing infrastructure associated with the venue.

9. The method of claim 1, wherein the server is part of a cloud server.

10. The method of claim 1, wherein:
    the defined participant criteria is that the participant be present at the venue; and
    the method further comprises:
       sending a notification to a participant that the NFT associated with the digital image is being offered for sale in the selective virtual gallery, wherein the notification is sent via a NFT marketplace device application associated with the NFT marketplace and installed on an electronic device of the participant,
       displaying, on the electronic device of the participant via the NFT marketplace device application, a selectable icon allowing the NFT marketplace device application to access the location of the participant from the electronic device of the participant;
       in response to the participant selecting the selectable icon and allowing the NFT marketplace device application to access the location of the participant, accessing the location of the participant from the electronic device of the participant;
       determining, based on the accessed location of the participant, whether the participant is present at the venue and therefore whether the participant is part of the selective group of participants, and
       in response to determining that the participant is part of the selective group of participants, granting the participant access to the selective virtual gallery of the NFT marketplace.

11. A server for creating and selectively offering for sale non-fungible tokens in a non-fungible token marketplace, the server configured to:
- interface with an electronic device of an issuer and verify the issuer's presence at a defined venue;
- receive, from the electronic device of the issuer, a digital image captured by the issuer at the defined venue;
- tokenize and store the digital image to a blockchain hosted by the server;
- create, from the tokenized digital image stored to the blockchain, a non-fungible token (NFT) associated with the digital image using a NFT contract;
- register the NFT associated with the digital image to an issuer NFT wallet associated with the issuer and hosted on an NFT marketplace compatible with the NFT contract;
- offer the NFT associated with image for sale in a selective virtual gallery of the NFT marketplace to a selective group of participants for a defined time period, wherein the offer is restricted such that each participant of the selective group of participants must meet a defined participant criteria;
- in response to one of the participants of the selective group of participants purchasing the NFT associated with the digital image within the defined time period, register the NFT associated with the digital image in a NFT wallet of the participant hosted on the NFT marketplace; and
- in response to none of the participants of the selective group of participants purchasing the NFT associated with the digital image within the defined time period, offer the NFT associated with the digital image for sale in an extensive virtual gallery of the NFT marketplace to an extensive group of participants, wherein the extensive group of participants includes participants that do not meet the defined participant criteria.

12. The server of claim 11, wherein the defined participant criteria is that the participant be present at the venue.

13. The server of claim 12, wherein the participant's presence at venue is identified by the server by a NFT marketplace device application associated with the NFT marketplace and installed on an electronic device of the participant, wherein the NFT device application is configured to acquire the participant's location from the electronic device of the participant.

14. The server of claim 11, wherein:
- an event is being held at the venue;
- the defined time period is the time frame during which the event takes place;
- the capturing of the digital image is performed at the event during the defined time period; and
- the defined participant criteria is that the participant be present at the event during the defined time period, wherein the participant's presence at event is identified by the sever by a NFT marketplace device application associated with the NFT marketplace and installed on an electronic device of the participant, wherein the NFT device application is configured to acquire the participant's location from the electronic device of the participant.

15. The server of claim 11, wherein the issuer's presence at the defined venue is verified by the server by a NFT marketplace device application associated with the NFT marketplace and installed on the electronic device of the issuer, wherein the NFT device application is configured to acquire the issuer's location from the electronic device of the issuer.

16. The server of claim 11, wherein:
- the offering of the NFT associated with digital image for sale in the selective virtual gallery of the NFT marketplace comprises offering the NFT associated with digital image for sale to a highest bidder; and
- the server is further configured to:
    - receive a bid from a plurality of participants of the selective group of participants,
    - determine the highest bidder of the plurality of participants based on the received bids, and
    - register the NFT associated with digital image to a NFT wallet of the highest bidder associated with the NFT marketplace.

17. The server of claim 11, wherein the defined participant criteria is that the participant be shown in the digital image.

18. The server of claim 11, wherein:
- the defined participant criteria is that the participant be present at the venue; and
- the server is further configured to:
    - send a notification to a participant that the NFT associated with the digital image is being offered for sale in the selective virtual gallery, wherein the notification is sent via a NFT marketplace device application associated with the NFT marketplace and installed on an electronic device of the participant,
    - cause the electronic device of the participant to display, via the NFT marketplace device application, a selectable icon allowing the NFT marketplace device application to access the location of the participant from the electronic device of the participant;
    - in response to the participant selecting the selectable icon and allowing the NFT marketplace device application to access the location of the participant, access the location of the participant from the electronic device of the participant;
    - determine, based on the accessed location of the participant, whether the participant is present at the venue and therefore whether the participant is part of the selective group of participants, and
    - in response to determining that the participant is part of the selective group of participants, granting the participant access to the selective virtual gallery of the NFT marketplace.

19. A system for creating and selectively offering for sale non-fungible tokens in a non-fungible token marketplace, the system comprising:
- an electronic device of an issuer, wherein the electronic device of the issuer includes or is compatible with a digital camera such that the electronic device of the issuer can store a digital image captured by the issuer at a defined venue using the digital camera; and
- a server configured to:
    - interface with the electronic device of the issuer and verify the issuer's presence at the defined venue,
    - receive, from the electronic device of the issuer, the digital image captured by the issuer at the defined venue,
    - tokenize and store the digital image to a blockchain hosted by the server,
    - create, from the tokenized digital image stored to the blockchain, a non-fungible token (NFT) associated with the digital image using a NFT contract,
    - register the NFT associated with the digital image to an issuer NFT wallet associated with the issuer and hosted on an NFT marketplace compatible with the NFT contract, offer the NFT associated with image for sale in a selective virtual gallery of the NFT marketplace to a selective group of participants for a defined time period, wherein the offering is restricted such that each participant of the selective group of participants must meet a defined participant criteria, in response to one of the participants of the selective group of participants purchasing the NFT associated with the digital image within the defined time period, register the NFT associated with the digital image in a NFT wallet of the participant hosted on the NFT marketplace, and in response to none of the participants of the selective group of participants purchasing the NFT associated with the digital image within the defined time period, offer the NFT associated with the digital image for sale in an extensive virtual gallery of the NFT marketplace to an extensive group of participants, wherein the extensive group of participants includes participants that do not meet the defined participant criteria.

20. The system of claim 19, wherein:
the defined participant criteria is that the participant be present at the venue;
the system further comprises an electronic device of a participant, wherein a NFT marketplace device application associated with the NFT marketplace is installed on the electronic device of the participant; and
the server is further configured to:
send a notification to the participant that the NFT associated with the digital image is being offered for sale in the selective virtual gallery, wherein the notification is sent via the NFT marketplace device application, cause the electronic device of the participant to display, via the NFT marketplace device application, a selectable icon allowing the NFT marketplace device application to access the location of the participant from the electronic device of the participant, in response to the participant selecting the selectable icon and allowing the NFT marketplace device application to access the location of the participant, access the location of the participant from the electronic device of the participant;

determine, based on the accessed location of the participant, whether the participant is present at the venue and therefore whether the participant is part of the selective group of participants, and in response to determining that the participant is part of the selective group of participants, granting the participant access to the selective virtual gallery of the NFT marketplace.

* * * * *